(12) United States Patent
Shi

(10) Patent No.: US 10,213,955 B2
(45) Date of Patent: Feb. 26, 2019

(54) STAMPING DEVICE

(71) Applicants: BOE TECHNOLOGY GROUP CO., LTD., Chaoyang District (CN); HEFEI BOE DISPLAY LIGHTING CO., LTD., Anhui (CN)

(72) Inventor: Zuchuan Shi, Beijing (CN)

(73) Assignees: BOE TECHNOLOGY GROUP CO., LTD., Beijing (CN); HEFEI BOE DISPLAY LIGHTING CO., LTD., Hefei, Anhui (CN)

( * ) Notice: Subject to any disclaimer, the term of this patent is extended or adjusted under 35 U.S.C. 154(b) by 368 days.

(21) Appl. No.: 15/137,423

(22) Filed: Apr. 25, 2016

(65) Prior Publication Data

US 2016/0318235 A1 Nov. 3, 2016

(30) Foreign Application Priority Data

Apr. 28, 2015 (CN) .......................... 2015 1 0209810

(51) Int. Cl.
*B29C 59/04* (2006.01)
*B29L 11/00* (2006.01)

(52) U.S. Cl.
CPC ....... *B29C 59/04* (2013.01); *B29L 2011/0075* (2013.01)

(58) Field of Classification Search
CPC ............. B29C 59/04; B29L 2011/0075; B31F 2201/0771; B31F 2201/0782; B32B 38/06; B41F 19/02
See application file for complete search history.

(56) References Cited

FOREIGN PATENT DOCUMENTS

| CN | 101439582 A | 5/2009 |
|---|---|---|
| CN | 101450530 A | 6/2009 |
| CN | 202911058 U | 5/2013 |
| JP | 2007203576 A | 8/2007 |
| TW | 201402309 A | 1/2014 |

OTHER PUBLICATIONS

First Office Action regarding Chinese application No. 201510209810. 2, dated Sep. 2, 2016. Translation provided by Dragon Intellectual Property Law Firm.

*Primary Examiner* — Joseph S Del Sole
*Assistant Examiner* — John Robitaille
(74) *Attorney, Agent, or Firm* — Harness, Dickey & Pierce, P.L.C.

(57) ABSTRACT

A stamping device for base materials includes: a first roller with at least one stamping pattern region at an outer surface thereof; a second roller at a first side of the first roller with a first stamping gap therebetween; a third roller at a second side of the first roller with a second stamping gap therebetween; a first delivery mechanism configured to, when the stamping pattern region rotates to a first position corresponding to the first stamping gap, deliver a base material to a first material-supplying side of the first stamping gap to stamp the base material; and a second delivery mechanism configured to, when the stamping pattern region rotates to a second position corresponding to the second stamping gap, deliver another base material to a second material-supplying side of the second stamping gap so as to stamp the another base material.

14 Claims, 3 Drawing Sheets

STAMPING DEVICE

CROSS-REFERENCE TO RELATED APPLICATION

The present application claims a priority of the Chinese patent application No. 201510209810.2 filed on Apr. 28, 2015, which is incorporated herein by reference in its entirety.

TECHNICAL FIELD

The present disclosure relates to the field of machining devices, in particular to a stamping device.

BACKGROUND

Usually, a light guide plate is applied to a liquid crystal display device and serves as an important component of a backlight source. The light guide plate is used to convert a linear light source, e.g., a light-emitting diode (LED), a cold cathode fluorescent lamp (CCFL) or a fluorescent lamp, into a surface light source.

The light guide plate is formed by printing light guide points (or dots) on a bottom surface of an optic polymethyl methacrylate (PMMA)/polycarbonate (PC) plate using an ultraviolet (UV) screen printing technology or laser printing technology. When light beams from the linear light source arrive at a lateral surface of the light guide plate, they may be reflected by the light guide points in various directions to the outside through a light-exiting surface. In addition, through the light guide points, it is able for the light guide plate to transmit the light beams evenly.

Usually, the light guide points on the light guide plate are formed by a stamping device. However, the production efficiency of the stamping device is usually low.

SUMMARY

An object of the present disclosure is to provide a stamping device, so as to improve the production efficiency.

The present disclosure provides in some embodiments a stamping device for base materials, including: a first roller, a second roller, a third roller, a first delivery mechanism and a second delivery mechanism. The first roller includes at least one stamping pattern region at an outer surface of the first roller. The second roller has a rotation direction opposite to a rotation direction of the first roller; the second roller is at a first side of the first roller with a first stamping gap between the first roller and the second roller; the first stamping gap has a first material-supplying side and a first material-discharging side. The third roller has a rotation direction opposite to the rotation direction of the first roller; the third roller is at a second side of the first roller with a second stamping gap between the first roller and the third roller; the second stamping gap has a second material-supplying side and a second material-discharging material. The first delivery mechanism is at the first material-supplying side of the first stamping gap and configured to, in the case that the stamping pattern region rotates to a first position corresponding to the first stamping gap, deliver a base material to the first material-supplying side of the first stamping gap so as to stamp the base material. The second delivery mechanism is at the second material-supplying side of the second stamping gap and configured to, in the case that the stamping pattern region rotates to a second position corresponding to the second stamping gap, deliver another base material to the second material-supplying side of the second stamping gap so as to stamp the another base material.

Further, the first delivery mechanism includes a first conveyor belt which includes a first material-loading end and a first material-unloading end, and the first material-unloading end of the first conveyor belt is at a position corresponding to the first material-supplying side of the first stamping gap. The second delivery mechanism includes a second conveyor belt which includes a second material-loading end and a second material-unloading end, and the second material-unloading end of the second conveyor belt is at a position corresponding to the second material-supplying side of the second stamping gap.

Further, the first material-loading end of the first conveyor belt and the second material-loading end of the second conveyor belt are at an identical side of the first roller.

Further, the stamping device further includes: a first detector configured to detect a position of the base material on the first conveyor belt; a second detector configured to detect a position of the another base material on the second conveyor belt; a first control module configured to control a delivery speed of the first conveyor belt and/or a rotation speed of the first roller in accordance with a detection result from the first detector, so as to deliver the base material on the first conveyor belt to the first material-supplying side of the first stamping gap in the case that the stamping pattern region rotates to the first position corresponding to the first stamping gap; and a second control module configured to control a delivery speed of the second conveyor belt and/or the rotation speed of the first roller in accordance with a detection result from the second detector, so as to deliver the another base material on the second conveyor belt to the second material-supplying side of the second stamping gap in the case that the stamping pattern region rotates to the second position corresponding to the second stamping gap.

Further, the first roller includes at least two stamping pattern regions at the outer surface of the first roller; the at least two stamping pattern regions include a first stamping pattern region and a second stamping pattern region; the second stamping pattern region is capable of rotating to the second position corresponding to the second stamping gap in the case that the first stamping pattern region rotates to the first position corresponding to the first stamping gap.

Further, the second roller includes a third stamping pattern region; the first delivery mechanism is further configured to, in the case that the third stamping pattern region rotates to a third position corresponding to the first stamping gap, deliver one base material to the first material-supplying side of the first stamping gap.

Further, the third roller includes a fourth stamping pattern region, and the second delivery mechanism is further configured to, in the case that the fourth stamping pattern region rotates to a fourth position corresponding to the second stamping gap, deliver another one base material to the second material-supplying side of the second stamping gap.

Further, the first stamping pattern region and the second stamping pattern region are at opposite sides of the first roller, respectively; the second roller and the third roller are at opposite sides of the first roller, respectively; central axes of the first roller, the second roller and the third roller are in an identical plane.

Further, the stamping device further includes a first movement mechanism configured to move the first roller and/or the second roller before the base material enters the first stamping gap so as to adjust the first stamping gap to be a first interval, and move the first roller and/or the second roller in the case that the base material enters the first stamping gap so as to adjust the first stamping gap to be a second interval. The first interval is greater than the second interval.

The stamping device further includes a second movement mechanism configured to move the first roller and/or the third roller before the another base material enters the second stamping gap so as to adjust the second stamping gap to be a third interval, and move the first roller and/or the third roller in the case that the another base material enters the second stamping gap so as to adjust the second stamping gap to be a fourth interval. The third interval is greater than the fourth interval.

Further, the base material is a resin material, and the stamping device further includes a first heating mechanism in the first roller and configured to heat the first roller, so as to heat the base materials entering the first stamping gap and the second stamping gap.

Further, the stamping device further includes a second heating mechanism in the second roller and configured to heat the second roller.

According to the embodiments of the present disclosure, the stamping device is provided with an additional auxiliary roller, so it is able to deliver the base materials to the stamping gaps formed by the at least two auxiliary rollers (i.e., the second roller and the third roller) and a primary roller (i.e., the first roller) through the at least two auxiliary rollers and the delivery mechanisms, respectively. After the base material is stamped through the primary roller and one of the auxiliary roller, the primary roller may rotate and cooperate with the other auxiliary roller to stamp another base material. As a result, it is able to stamp at least two base materials within one revolution of the primary roller, thereby to remarkably improve the production efficiency.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure.

Figure 1:
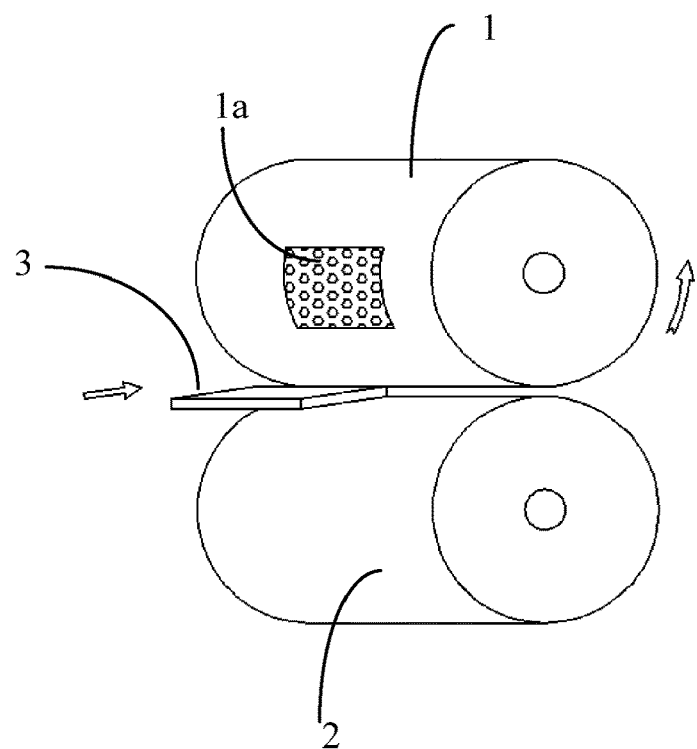
FIG. 1 is a schematic view showing a stamping device in the related art.

As shown in FIG. 1, which is a schematic view showing a stamping device for a light guide plate. The stamping device includes a primary roller 1, an auxiliary roller 2 and a conveyor belt. A stamping pattern region 1a is provided at an outer surface of the primary roller 1 (a stamping pattern may be engraved onto a special steel plate by a laser or impactor to form a stamper, and then the stamper is curled and fixed onto the primary roller, so as to form the stamping pattern region). The primary roller 1 and the auxiliary roller 2 are arranged opposite to each other, and a stamping gap is formed therebetween. A material-unloading end of the conveyor belt is arranged at a position corresponding to a material-supplying side of the stamping gap. During the stamping, a base material 3 of the light guide plate is delivered by the conveyor belt from the material-supplying side to the stamping gap. The primary roller and the stamper are heated by hot oil in a cavity of the primary roller to a temperature approaching or reaching an elastomeric-state temperature of a polymer material that forms the light guide plate. Through position detection and control, it is able to transfer the pattern at the stamping pattern region on the outer surface of the primary roller onto the base material of the light guide plate when the light guide plate passes through the stamping gap between the primary roller and the auxiliary roller. In addition, during the transferring, the stamping gap is narrowed to a value less than a thickness of the base material, so as to press the base material and facilitate the transferring of the stamping pattern onto the base material.

However, the stamping device in the related art merely includes two rollers, and for one revolution of the primary roller, merely one light guide plate may be treated, so the production efficiency is relatively low.

In order to overcome the above-mentioned drawback, the present disclosure provides in some embodiments a stamping device, so as to improve the production efficiency.

Figure 2:
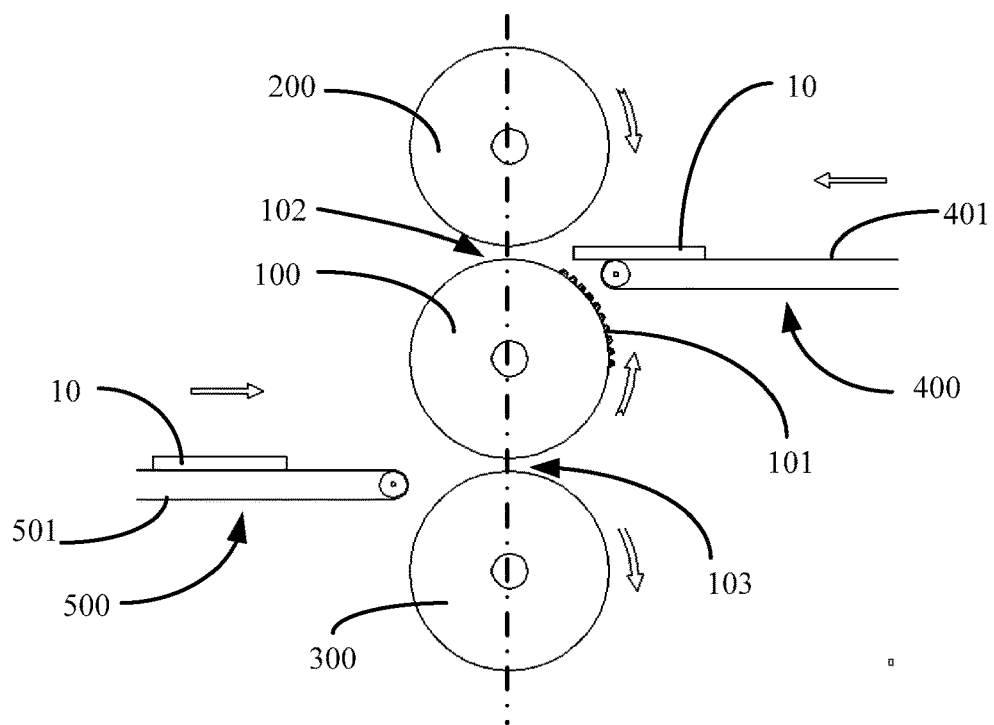
FIG. 2 is a schematic view showing a stamping device according to one embodiment of the present disclosure.
Figure 3:
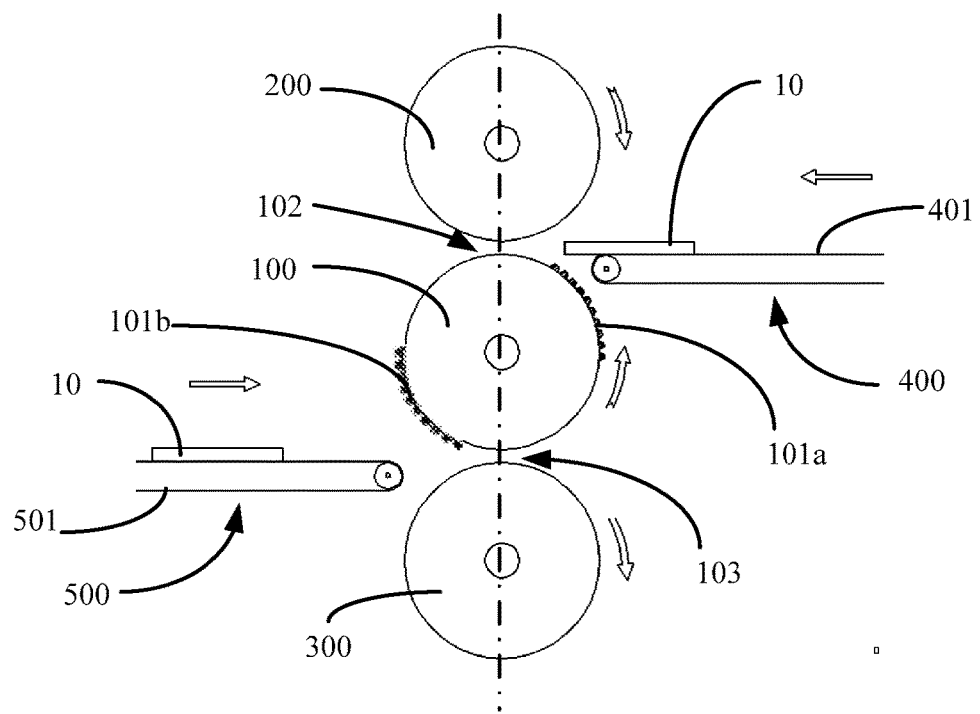
FIG. 3 is another schematic view showing the stamping device according to one embodiment of the present disclosure.

As shown in FIGS. 2-3, the stamping device in the embodiments of the present disclosure may be used to stamp base materials. The stamping device includes a first roller 100, a second roller 200, a third roller 300, a first delivery mechanism 400 and a second delivery mechanism 500.

At least one stamping pattern region 101 is arranged at an outer surface of the first roller 100.

The second roller 200 is arranged at a first side of the first roller 100 and rotates in a direction opposite to the first roller 100. A first stamping gap 102 is formed between the first roller 100 and the second roller 200. The first stamping gap 102 includes a first material-supplying side and a first material-discharging side.

The third roller 300 is arranged at a second side of the first roller 100 and rotates in a direction opposite to the first roller 100. A second stamping gap 103 is formed between the first roller 100 and the third roller 300. The second stamping gap 103 includes a second material-supplying side and a second material-discharging side.

The first delivery mechanism 400 is arranged at the first material-supplying side of the first stamping gap 102. The first delivery mechanism 400 is configured to, when the stamping pattern region 101 rotates to a first position corresponding to the first stamping gap 102, deliver a base material 10 to the first material-supplying side of the first stamping gap 102 so as to stamp the base material 10.

The second delivery mechanism 500 is arranged at the second material-supplying side of the second stamping gap 103. The second delivery mechanism 500 is configured to, when the stamping pattern region 101 rotates to a second position corresponding to the second stamping gap 103, deliver another base material 10 to the second material-supplying side of the second stamping gap 103 so as to stamp the further base material 10.

As compared with the stamping device in FIG. 1, the stamping device in the embodiments of the present disclosure is provided with an additional auxiliary roller. Through the two auxiliary rollers (i.e., the second roller 200 and the third roller 300), it is able to deliver the base material 10 by the first delivery mechanism 400 to the first stamping gap 102 when the stamping pattern region 101 on the primary roller (i.e., the first roller 100) rotates to the first stamping gap 102, thereby to stamp the base material 10. Then, the primary roller continues to rotate, and when the stamping pattern region 101 rotates to the second stamping gap 103, it is able to deliver the another base material 10 by the second delivery mechanism 500 to the second stamping region 103, thereby to stamp the another base material 10. As a result, it is able for the stamping device in the embodiments of the present disclosure to stamp two base materials 10 within one revolution of the primary roller, thereby to remarkably improve the production efficiency.

It should be appreciated that, in the stamping device according to the embodiments of the present disclosure, there may be more than two auxiliary rollers, and correspondingly, there may also be more than two delivery mechanisms. At this point, it is able to stamp more than two base materials 10 within one revolution of the primary roller.

It should be further appreciated that, the stamping device in the embodiments of the present disclosure may be used to stamp the base material 10, e.g., a resin material, by a heat stamping technology. For example, the base material of a light guide plate may be stamped thermally, so as to form light guide points (dots). Of course, the stamping device may also adopt any other stamping technologies, and may be used to stamp a base material other than the base material of the light guide plate.

Figure 4:
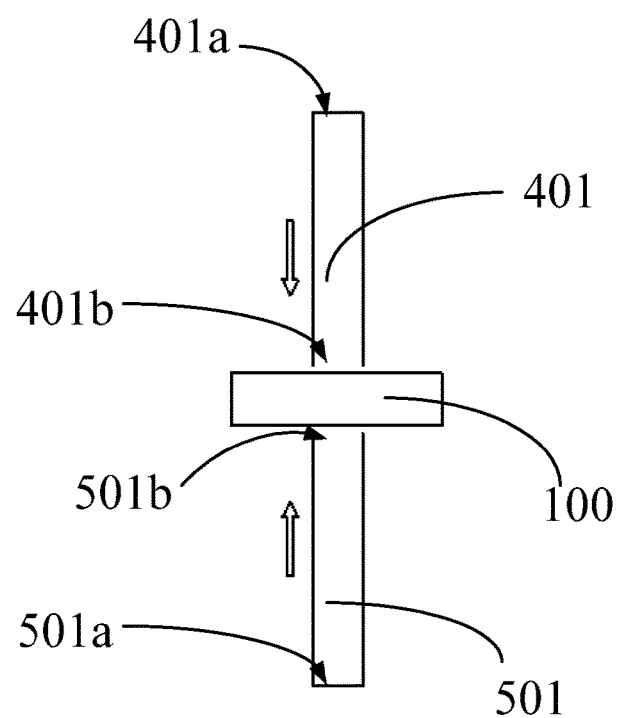
FIG. 4 is a top view of the stamping device where a first material-loading end of a first delivery mechanism and a second material-loading end of a second delivery mechanism are arranged at two sides of a first roller according to one embodiment of the present disclosure.
Figure 5:
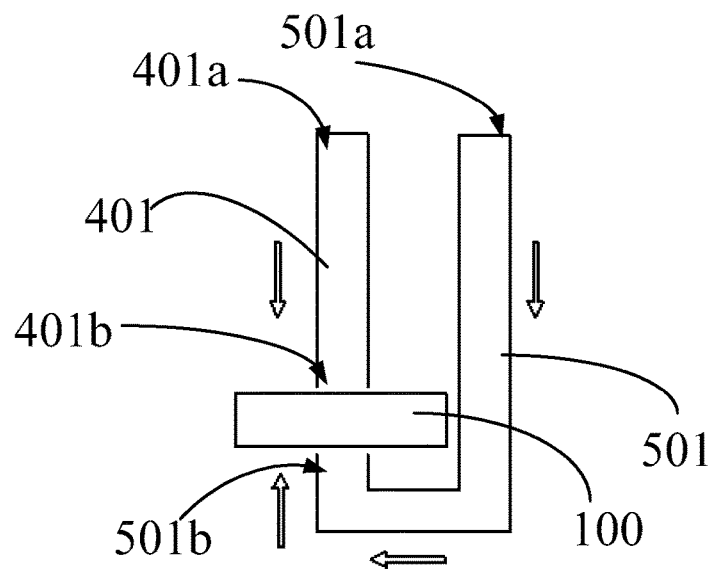
FIG. 5 is another top view of the stamping device where the first material-loading end of the first delivery mechanism and the second material-loading end of the second delivery mechanism are arranged at an identical side of the first roller according to one embodiment of the present disclosure.

Optionally, as shown in FIGS. 4 and 5, the first delivery mechanism 400 includes a first conveyor belt 401. The first conveyor belt 401 includes a first material-loading end 401a and a first material-unloading end 401b. The first material-unloading end 401b of the first conveyor belt 401 is arranged at a position corresponding to the first material-supplying side of the first stamping gap 102.

The second delivery mechanism 500 includes a second conveyor belt 501. The second conveyor belt 501 includes a second material-loading end 501a and a second material-unloading end 501b. The second material-unloading end 501b of the second conveyor belt 501 is arranged at a position corresponding to the second material-supplying side of the first stamping gap 102.

Through the conveyor belts, it is able for the first delivery mechanism 400 and the second delivery mechanism 500 to deliver the base materials 10 to the stamping gaps each formed between the two rollers.

It should be appreciated that, in some other embodiments, the first delivery mechanism 400 and the second delivery mechanism 500 may be in any other forms. For example, the first delivery mechanism 400 or the second delivery mechanism 500 may be a mechanical arm. Hence, the structure of the first delivery mechanism 400 or the second delivery mechanism 500 will not be particularly defined herein.

In addition, the first material-loading end 401a of the first delivery mechanism 400 and the second material-loading end 501a of the second delivery mechanism 500 may be arranged two sides of the first roller 100, respectively, or at an identical side of the first roller 100.

FIG. 4 is a top view of the stamping device where the first material-loading end of the first delivery mechanism and the second material-loading end of the second delivery mechanism are arranged at two sides of the first roller. FIG. 5 is another top view of the stamping device where the first material-loading end of the first delivery mechanism and the second material-loading end of the second delivery mechanism are arranged at an identical side of the first roller.

Optionally, the first material-loading end 401a of the first conveyor belt 401 and the second material-loading end 501a of the second conveyor belt 501 are arranged at an identical side of the first roller 100.

As shown in FIGS. 4 and 5, in the case that the first material-loading end 401a of the first conveyor belt 401 and the second material-loading end 501a of the second conveyor belt 501 are arranged at an identical side of the first roller 100, it is able to reduce a size of the stamping device and facilitate the supply of the base material.

Figure 6:
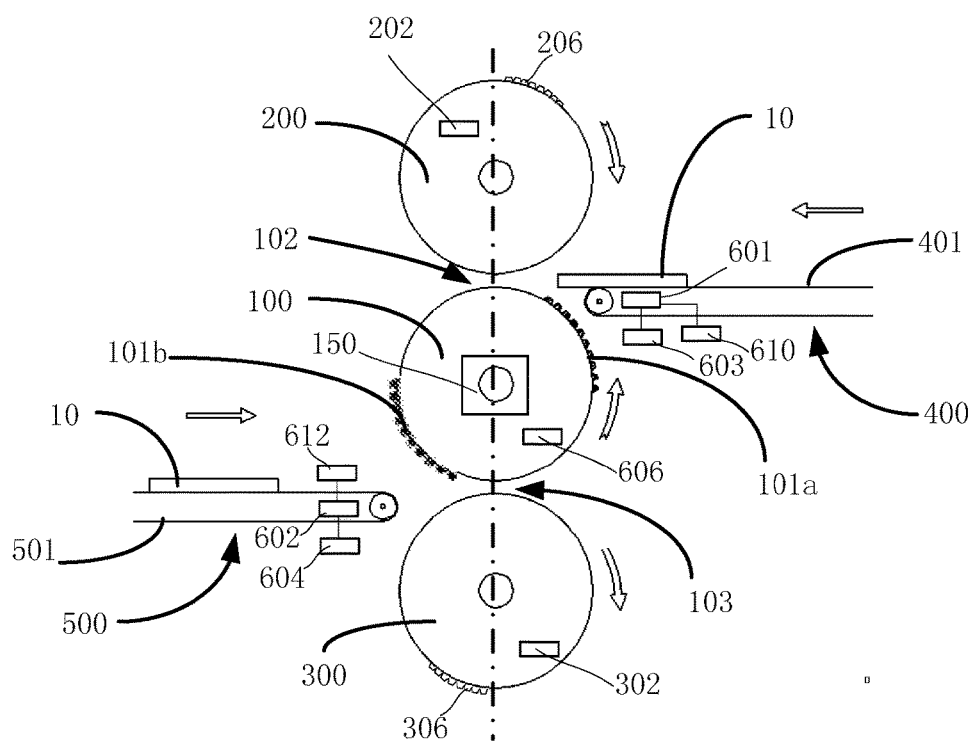
FIG. 6 is yet another schematic view showing the stamping device according to one embodiment of the present disclosure.

Optionally, as shown in FIG. 6, the stamping device further includes a first detector 601, a second detector 602, a first control module 603 and a second control module 604.

The first detector is configured to detect a position of the base material 10 on the first conveyor belt 401. The second detector is configured to detect a position of the base material 10 on the second conveyor belt 501.

The first control module is configured to control a delivery speed of the first conveyor belt 401 and/or a rotation speed of the first roller 100 in accordance with a detection result from the first detector, so as to deliver the base material 10 on the first conveyor belt 401 to the first material-supplying side of the first stamping gap 102 when the stamping pattern region 101 rotates to the first position corresponding to the first stamping gap 102.

The second control module is configured to control a delivery speed of the second conveyor belt 501 and/or the rotation speed of the first roller 100 in accordance with a detection result from the second detector, so as to deliver the base material 10 on the second conveyor belt 501 to the second material-supplying side of the second stamping gap 103 when the stamping pattern region 101 rotates to the second position corresponding to the second stamping gap 103.

During the rotation of the first roller 100, in the case that the stamping pattern region 101 on the first roller 100 moves to the first position corresponding to the first stamping gap 102, the base material 10 on the first conveyor belt 401 may enter the first stamping gap 102 and then be stamped. In the case that the stamping pattern region 101 on the first roller 100 moves to the second position corresponding to the second stamping gap 103, the base material 10 on the second conveyor belt 501 may enter the second stamping gap 103 and then be stamped. In other words, the base materials 10 may be stamped within one revolution of the first roller 100.

Optionally, the stamping device in the embodiments of the present disclosure may stamp the base material 10 by a heat stamping technology. At this time, the stamping device may further include a first heating mechanism 606. The first heating mechanism 606 is arranged within the first roller 100 and configured to heat the first roller 100, thereby to heat the base materials 10 entering the first stamping gap 102 and the second stamping gap 103.

Optionally, the first heating mechanism may be a hot-oil heating structure or an electromagnetic heating structure within the first roller, so as to heat the first roller 100 and a stamper on the first roller 100 to a temperature approaching or reaching an elastomeric-state temperature of the base material 10 (e.g., a resin material). For example, for the light guide plate made of PMMA, usually it may be heated to a temperature of about 100□.

In addition, it should be appreciated that, the second roller 200 and the third roller 300 may also be provided with a second heating mechanism 202 and a third heating mechanism 302 respectively, so as to heat the second roller 200 and the third roller 300 (e.g., to a temperature of about 30 □). The second heating mechanism may be a hot-oil heating structure or an electromagnetic heating structure within the second roller, and the third heating mechanism may be a hot-oil heating structure or an electromagnetic heating structure within the third roller.

In order to further improve the production efficiency, optionally, as shown in FIG. 3, at least two stamping pattern regions may be provided at the outer surface of the first roller 100 and include a first stamping pattern region 101a and a second stamping pattern region 101b. The second stamping pattern region 101b is capable of rotating to the second position corresponding to the second stamping gap 103 in the case that the first stamping pattern region 101a rotates to the first position corresponding to the first stamping gap 102.

The first roller 100 may be provided with at least two stamping pattern regions 101a and 101b, and as shown in FIG. 3, the first stamping pattern region 101a and the second stamping pattern region 101b are arranged on the first roller 100 at positions exactly corresponding to the second roller 200 and the third roller 300. In other words, in the case that one of the stamping pattern regions rotates to the first position corresponding to the first stamping gap 102, the other stamping pattern region exactly rotates to the second position corresponding to the second stamping region 103. In this way, in the case that the first stamping pattern region 101a rotates to the first position corresponding to the first stamping gap 102, the second stamping pattern region 101b exactly rotates to the second position corresponding to the second stamping region 103, so as to stamp the two base materials 10 simultaneously. In the case that the first stamping pattern region 101a continues to rotate to the second position corresponding to the second stamping gap 103, a third base substrate 10 entering the second stamping gap 103 may be further stamped. As a result, it is able to stamp at least three base materials 10 within one revolution of the first roller 100, thereby to further improve the production efficiency.

In the case that at least two stamping pattern regions 101 are provided at the outer surface of the first roller 100, the delivery speed of the second conveyor belt 501 and/or the rotation speed of the first roller 100 may be controlled through the cooperation of the second detector and the second control module, so as to exactly deliver another base material 10 on the second conveyor belt 501 to the second material-supplying side of the second stamping gap 103 when the first stamping pattern region 101a rotates to the second position corresponding to the second stamping gap 103.

Optionally, as shown in FIG. 3, the first stamping pattern region 101a and the second stamping pattern region 101b are arranged at opposite sides of the first roller 100, respectively. The second roller 200 and the third roller 300 are arranged at opposite sides of the first roller 100, respectively, and central axes of the first roller 100, the second roller 200 and the third roller 300 are located within an identical plane. In this way, in the case that the first stamping pattern region 101a rotates to the first position corresponding to the first stamping gap 102, the second stamping pattern region 101b exactly rotates to the second position corresponding to the second stamping gap 103. In the case that the first stamping pattern region 101a continues to rotate to the second position corresponding to the second stamping gap 103, the second stamping pattern region 101b exactly rotates to the first position corresponding to the first stamping gap 102. As a result, it is able to stamp at least four base materials within one revolution of the first roller 100, thereby to further improve the production efficiency.

Optionally, as shown in FIG. 6, the second roller 200 may further be provided with a third stamping pattern region 206. The first delivery mechanism 400 is further configured to, in the case that the third stamping pattern region rotates to a third position corresponding to the first stamping gap 102, deliver one base material 10 to the first material-supplying side of the first stamping gap 102. Through the stamping pattern region on the auxiliary roller, it is able to further improve the production efficiency and meet the requirements of a special base material (e.g., in the case that the dots need to be stamped on both sides of the light guide plate).

At this point, the stamping device further includes a third control module 610 configured to control the delivery speed of the first conveyor belt 401 and/or the rotation speed of the second roller 200 in accordance with the detection result from the first detector, so as to deliver the base material 10 on the first conveyor belt 401 to the first material-supplying side of the first stamping gap 102 in the case that the third stamping pattern region rotates to a third position corresponding to the first stamping gap 102.

Optionally, as shown in FIG. 6, the third roller may be provided with a fourth stamping pattern region 306. The second delivery mechanism 500 may be further configured to, in the case that the fourth stamping pattern region 306 rotates to a fourth position corresponding to the second stamping gap 103, deliver another base material to the second material-supplying side of the second stamping gap 103. Through the stamping pattern region on the auxiliary roller, it is able to further improve the production efficiency and meet the requirements of a special base material (e.g., in the case that the dots need to be stamped on both sides of the light guide plate).

At this point, the stamping device further includes a fourth control module 612 configured to control the delivery speed of the second conveyor belt 501 and/or a rotation speed of the third roller 300 in accordance with the detection result from the second detector, so as to deliver another base material 10 on the second conveyor belt 501 to the first material-supplying side of the second stamping gap 103 in the case that the fourth stamping pattern region rotates to a fourth position corresponding to the second stamping gap 103.

Optionally, the stamping device further includes a first movement mechanism configured to move the first roller 100 and/or the second roller 200 before the base material 10 enters the first stamping gap 102 so as to adjust the first stamping gap 102 to be a first interval, and move the first roller 100 and/or the second roller 200 in the case that the base material 10 enters the first stamping gap 102 so as to adjust the first stamping gap 102 to be a second interval. The first interval is greater than the second interval.

The interval of the first stamping gap 102 may be adjusted through the first movement mechanism, so as to provide the first stamping gap 102 with a larger interval before the base material 10 enters the first stamping gap 102, thereby to facilitate the supply of the base material 10. After the base material 10 enters the first stamping gap 102, the interval of the first stamping gap 102 may be reduced (e.g., to be less than a thickness of the base material 10), so as to apply a force to the base material 10, thereby to facilitate the thermal stamping.

Optionally, the stamping device further includes a second movement mechanism configured to move the first roller 100 and/or the third roller 300 before one base material 10 enters the second stamping gap 103 so as to adjust the second stamping gap 103 to be a third interval, and move the first roller 100 and/or the third roller 300 in the case that the one base material 10 enters the second stamping gap 103 so as to adjust the second stamping gap 103 to be a fourth interval. The third interval is greater than the fourth interval.

The interval of the second stamping gap 103 may be adjusted through the second movement mechanism, so as to provide the second stamping gap 103 with a larger interval before one base material 10 enters the second stamping gap 103, thereby to facilitate the supply of the further base material 10. After the one base material 10 enters the second stamping gap 103, the interval of the second stamping gap 103 may be reduced (e.g., to be less than a thickness of the further base material 10), so as to apply a force to the one base material 10, thereby to facilitate the thermal stamping.

Optionally, the first movement mechanism and the second movement mechanism may be an identical movement mechanism 150 (as shown in FIG. 6), so as to move the first roller 100 (e.g., move a rotatable shaft of the first roller 100 in various directions), thereby to adjust the first stamping gap 102 and the second stamping gap 103.

The above are merely the optional embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A stamping device for base materials, comprising: a first roller, a second roller, a third roller, a first delivery mechanism and a second delivery mechanism;
   wherein the first roller comprises at least one stamping pattern region at an outer surface of the first roller;
   wherein the second roller has a rotation direction opposite to a rotation direction of the first roller; the second roller is at a first side of the first roller with a first stamping gap between the first roller and the second roller; the first stamping gap has a first material-supplying side and a first material-discharging side;
   wherein the third roller has a rotation direction opposite to the rotation direction of the first roller; the third roller is at a second side of the first roller with a second stamping gap between the first roller and the third roller; the second stamping gap has a second material-supplying side and a second material-discharging material;
   wherein the first delivery mechanism is at the first material-supplying side of the first stamping gap and configured to, in the case that the stamping pattern region rotates to a first position corresponding to the first stamping gap, deliver a base material to the first material-supplying side of the first stamping gap so as to stamp the base material; and
   wherein the second delivery mechanism is at the second material-supplying side of the second stamping gap and configured to, in the case that the stamping pattern region rotates to a second position corresponding to the second stamping gap, deliver another base material to the second material-supplying side of the second stamping gap so as to stamp the another base material.

2. The stamping device according to claim 1, wherein the first delivery mechanism comprises a first conveyor belt which comprises a first material-loading end and a first material-unloading end, and the first material-unloading end of the first conveyor belt is at a position corresponding to the first material-supplying side of the first stamping gap; and
   the second delivery mechanism comprises a second conveyor belt which comprises a second material-loading end and a second material-unloading end, and the second material-unloading end of the second conveyor belt is at a position corresponding to the second material-supplying side of the second stamping gap.

3. The stamping device according to claim 2, wherein the first material-loading end of the first conveyor belt and the second material-loading end of the second conveyor belt are at an identical side of the first roller.

4. The stamping device according to claim 2, further comprising:
   a first detector configured to detect a position of the base material on the first conveyor belt;
   a second detector configured to detect a position of the another base material on the second conveyor belt;
   a first control module configured to control a delivery speed of the first conveyor belt and/or a rotation speed of the first roller in accordance with a detection result from the first detector, so as to deliver the base material on the first conveyor belt to the first material-supplying side of the first stamping gap in the case that the stamping pattern region rotates to the first position corresponding to the first stamping gap; and
   a second control module configured to control a delivery speed of the second conveyor belt and/or the rotation speed of the first roller in accordance with a detection result from the second detector, so as to deliver the another base material on the second conveyor belt to the second material-supplying side of the second stamping gap in the case that the stamping pattern region rotates to the second position corresponding to the second stamping gap.

5. The stamping device according to claim 1, wherein the first roller comprises at least two stamping pattern regions at the outer surface of the first roller; the at least two stamping pattern regions comprise a first stamping pattern region and a second stamping pattern region; the second stamping pattern region is capable of rotating to the second position corresponding to the second stamping gap in the case that the first stamping pattern region rotates to the first position corresponding to the first stamping gap.

6. The stamping device according to claim 5, wherein the second roller comprises a third stamping pattern region; the first delivery mechanism is further configured to, in the case that the third stamping pattern region rotates to a third position corresponding to the first stamping gap, deliver one base material to the first material-supplying side of the first stamping gap.

7. The stamping device according to claim 6, wherein the third roller comprises a fourth stamping pattern region, and the second delivery mechanism is further configured to, in the case that the fourth stamping pattern region rotates to a fourth position corresponding to the second stamping gap, deliver another one base material to the second material-supplying side of the second stamping gap.

8. The stamping device according to claim 5, wherein the first stamping pattern region and the second stamping pattern region are at opposite sides of the first roller, respectively; the second roller and the third roller are at opposite sides of the first roller, respectively; central axes of the first roller, the second roller and the third roller are in an identical plane.

9. The stamping device according to claim 1, further comprising a first movement mechanism configured to move the first roller and/or the second roller before the base material enters the first stamping gap so as to adjust the first stamping gap to be a first interval, and move the first roller and/or the second roller in the case that the base material enters the first stamping gap so as to adjust the first stamping gap to be a second interval;

wherein the first interval is greater than the second interval.

10. The stamping device according to claim 9, further comprising a second movement mechanism configured to move the first roller and/or the third roller before the another base material enters the second stamping gap so as to adjust the second stamping gap to be a third interval, and move the first roller and/or the third roller in the case that the another base material enters the second stamping gap so as to adjust the second stamping gap to be a fourth interval;

wherein the third interval is greater than the fourth interval.

11. The stamping device according to claim 1, wherein the base material is a resin material, and the stamping device further comprises a first heating mechanism in the first roller and configured to heat the first roller, so as to heat the base materials entering the first stamping gap and the second stamping gap.

12. The stamping device according to claim 11, further comprising a second heating mechanism in the second roller and configured to heat the second roller.

13. The stamping device according to claim 1, wherein the second roller comprises a stamping pattern region; and the first delivery mechanism is further configured to, in the case that the stamping pattern region of the second roller rotates to a third position corresponding to the first stamping gap, deliver one base material to the first material-supplying side of the first stamping gap.

14. The stamping device according to claim 13, wherein the third roller comprises a stamping pattern region, and the second delivery mechanism is further configured to, in the case that the stamping pattern region of the third roller rotates to a fourth position corresponding to the second stamping gap, deliver another one base material to the second material-supplying side of the second stamping gap.

* * * * *